United States Patent [19]

Rouchon

[11] Patent Number: 4,727,476
[45] Date of Patent: Feb. 23, 1988

[54] SIMULATION AND SECURITY DEVICE FOR DATA ENTRY KEYBOARD

[75] Inventor: René C. Rouchon, Paris, France

[73] Assignee: Palais de la Decouverte, France

[21] Appl. No.: 796,881

[22] Filed: Nov. 12, 1985

[30] Foreign Application Priority Data

Nov. 9, 1984 [FR] France ............................ 84 17104

[51] Int. Cl.⁴ .......................... G06F 9/18; G06F 12/14
[52] U.S. Cl. ........................................ 364/200; 380/23; 380/29
[58] Field of Search ... 364/200 MS File, 900 MS File; 380/23, 24, 25, 29, 37

[56] References Cited

U.S. PATENT DOCUMENTS

| | | | |
|---|---|---|---|
| 3,924,110 | 12/1975 | Cochran | 364/200 |
| 3,984,637 | 10/1976 | Caudill et al. | 364/200 |
| 4,104,721 | 8/1978 | Markstein et al. | 364/200 |
| 4,652,990 | 3/1987 | Pailen et al. | 380/24 |

OTHER PUBLICATIONS

Patents Abstract of Japan, vol. 8, No. 151 (P-286)(1588), 13 Juillet 1984, & JP-A 59-49 641 (Fujitsu K. K.), 22-0301984.

Primary Examiner—Archie E. Williams, Jr.
Assistant Examiner—A. Mohamed

[57] ABSTRACT

A simulation security device for a data entry keyboard of a computer is operative with an input-output unit and a keyboard of the computer. The device includes plural memories and a switching assembly which are operatively coupled to row and column signals generated by the keyboard. One memory stores coded call instructions of a working program, and a second memory stores call instructions of the working program and addresses of these instructions, there being an address counter associated with the second memory. The memories are connected via the input-output unit and the switching assembly for responding to row and column signals of the keyboard to permit the transmission of call instructions to the computer so as to prevent any transmission of coded instructions of the keyboard during an initialization and a transmission of call instructions. Thereafter, the security device allows the transmission of instructions from the keyboard after completion of reception of all of the call instructions by the computer.

2 Claims, 1 Drawing Figure

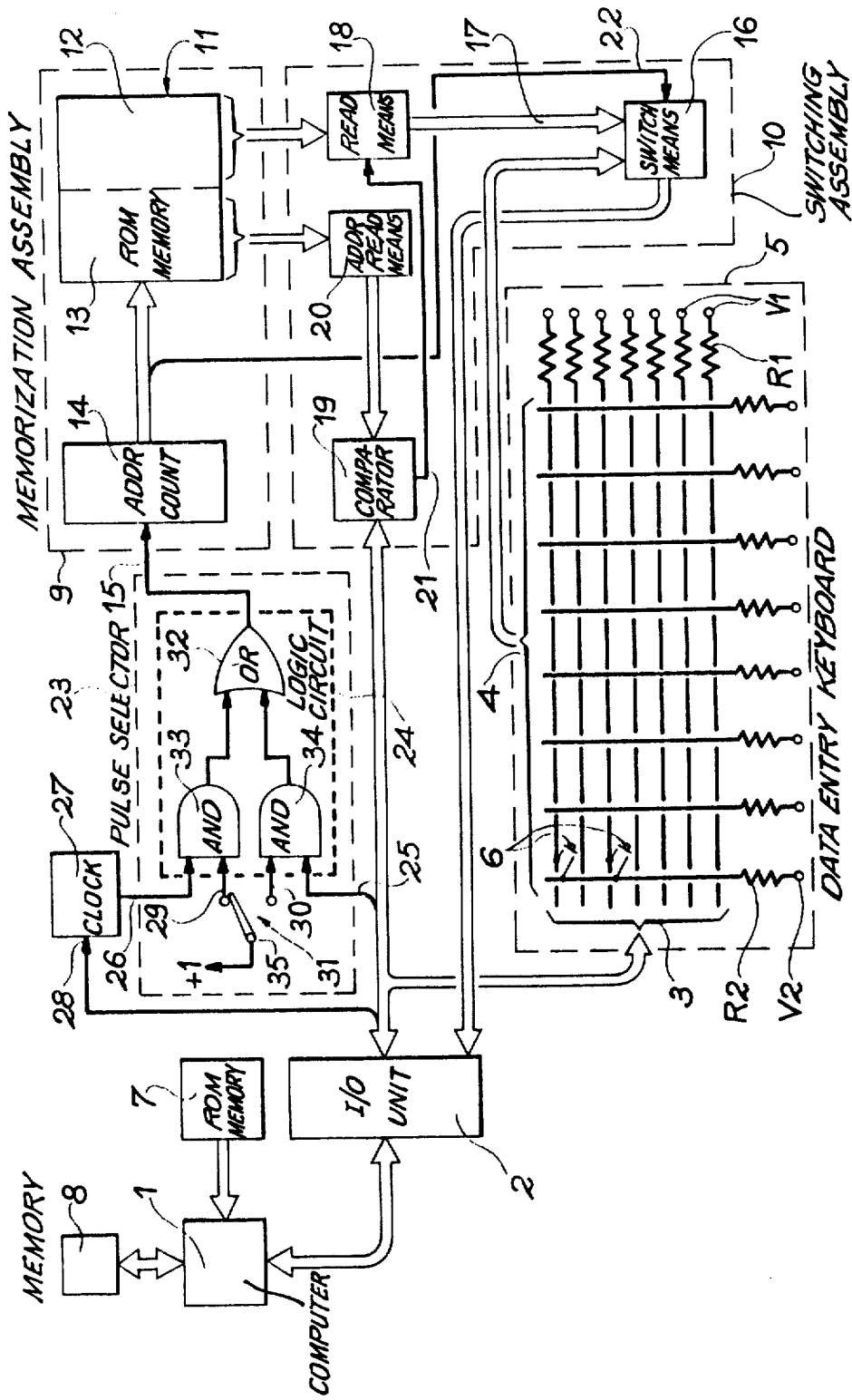

SIMULATION AND SECURITY DEVICE FOR DATA ENTRY KEYBOARD

BACKGROUND OF THE INVENTION

The present invention relates to a simulation and security device for a data entry keyboard of a computer. It applies to the transmission of call instructions to a computer from a data entry keyboard. It makes it possible particularly to prevent any operator working on this keyboard from using the computer with a program other than the one on which this computer must operate.

It is known that a computer operates from a working program recorded in a memory. This working program can be executed only after the computer has been initialized. This initialization program is generally recorded in a read-only memory (ROM memory) and the working program is executed when, after the initialization, call instructions, specific to the program in question, are transmitted to the computer through an operator acting on the data entry keyboard of this computer. The working program, which is generally contained in a random-access memory, therefore cannot be executed unless the call instructions of this program have been correctly given through the keyboard. If an operator transmits instructions different from those which are necessary for the execution of the program, this operator can then work on a program different from the one which was intended to be used by the operator. This happens frequently, especially when the computers are used for education. Indeed, it often happens that, in this type of application, the students introduce, after initialization, instructions which do not correspond at all to the call instructions of the program; these students then work on a program of their choice which does not at all correspond to the program intended for the desired teaching.

SUMMARY OF THE INVENTION

It is the object of the invention to remedy these deficiencies, and particularly to provide a simulation and security device for a data entry keyboard, this device preventing the operation of a computer from a program different from the one on the basis of which this computer is to normally operate.

The subject matter of the invention is a simulation and security device for a data entry keyboard of a computer, this keyboard including rows and columns of selector keys, the depression of a key selecting a row and a column and thus permitting the transmission of a coded call instruction corresponding to the computer through an input-output unit connected to the computer and to the rows and columns, this input-output unit supplying scan pulses to the rows of the keyboard, and the computer being connected to at least one memory containing an initialization program and at least one memory containing a program which is called up, after initialization, when a series of coded call instructions have been transmitted to the computer by the keyboard, characterized in that it includes a memorization assembly containing the said coded call instructions, which is connected to the input-output unit, and a switching assembly connected to the memorization assembly, to the columns of the keyboard and to the input-output unit to permit the transmission of the call instructions to the computer, to prevent any transmission of coded instructions from the keyboard during the initialization and the transmission of the call instructions, then to allow the transmission of instructions from the keyboard when all of the call instructions have been received by the computer.

According to another feature of the invention, the memorization assembly includes a command memory containing the said call instructions as well as the coded addresses of these instructions, an address counter connected to this command memory and to a command output of a pulse selector to receive address command pulses from the command memory, synchronized with the keyboard row scan pulses. The switching means include a switch circuit connected by inputs to call instruction reading means which themselves are connected to the command memory, to an output of the counter and to the columns of the keyboard, outputs of the switching means being connected to inputs of the input-output unit, these switching means furthermore including a comparator connected to outputs of the input-output unit so as to receive at each instant a keyboard row scan code, this comparator being also connected to means for reading the coded addresses of the call instructions, one output of this comparator being connected to the call instruction reading means to command the transfer of the call instructions to the switching means and to the input-output unit when the code of the scanned row corresponds to the code of the call instruction address, the switching means connected to the counter blocking any transfer of instructions from the keyboard during the initialization and during the scanning of the addresses of the memory and of the rows of the keyboard.

According to another feature, the pulse selector includes a logic circuit of which one input is connected to one output of the input-output unit to receive memory address command pulses coming from the computer, another input of which is connected to an output of an external clock supplying memory address command pulses, one output of this selector being connected to an input of the counter, two command inputs of this selector being connected to a selector switch to select the pulses coming from the input-output unit or from the external clock, the address command pulses being synchronized with the keyboard row scan pulses.

BRIEF DESCRIPTION OF THE DRAWING

The sole FIGURE of the drawing shows circuitry of the security device of the invention, the FIGURE being partially in schematic and partially in block diagrammatic form.

DESCRIPTION OF THE PREFERRED EMBODIMENT

The computer 1 is connected to an input-output unit 2 which itself is connected to the rows 3 and to the columns 4 of a data entry keyboard 5, as will be seen in detail further below. This keyboard includes keys 6 which are not all represented in the drawing. The columns and the rows of the keyboard are set permanently at a logic level 1, for example, by means of the voltages +V1, +V2, applied to these rows and these columns, respectively, through resistances R1, R2. The computer is also connected to a read-only memory 7 (ROM memory) which contains an initialization program, and to a memory 8 (a live memory for example) which contains a working program; this program cannot be operated, as indicated above, unless it is accessed by certain instructions introduced by the operator by means of the keyboard 5. This keyboard normally operates in the following manner: all the rows and all the columns are at a logic level 1. The microprocessor namely the computer 1, by means of the input-output unit 2, periodically and successively scans the rows of the keyboard applying to them pulses of logic level 0. When the operator wishes to send an instruction to the computer 1, he depresses a key 6, for example; when the scan pulse of logic level 0 is applied to the row corresponding to this key, a pulse of logic level 0 also appears on the corresponding column. The result is that the computer receives, through the medium of the input-output unit 2, a code corresponding to the scanned row and to the column of the key that has been depressed. Thus, for example, if the keyboard has 8 rows and 8 columns and the key depressed corresponds to the first row and to the second column, the code transmitted to the computer by the first row is 01111111, whereas the code corresponding to the second column is 10111111. It is therefore seen that, after the initialization of the computer, the operator can send instructions to this computer through the keyboard. These instructions must normally be call instructions permitting the performance of the program contained in the live memory 8. The security device which is now going to be described makes it possible to prevent the sending of any instructions to the computer after the initialization of the latter; it therefore makes it possible to prevent any operator from working on a program other than the working instruction contained in the memory 8.

The security device comprises a memorization assembly 9 containing coded call call instructions of the working program. This memorization assembly is connected to the input-output unit 2, and to a switching assembly 10 which will be described in detail further on. This switching assembly is also connected to the rows 3 and columns 4 of the keyboard 5, as well as to the input-output unit 2. As it will be seen further on, it makes it possible to transmit call instructions of the work- ing program to the computer through the input-output unit 2. It also makes it possible to prevent any transmission of coded instructions from the keyboard during the initializa- tion and the transmission of the call instructions contained in the memorization assembly 9; it then allows the transmission of instructions from the keyboard when all of the call instruc- tions have been received by the computer.

The memorization assembly 9 comprises a command memory 11 (of the ROM type, for example). This memory comprises two parts 12 and 13 which contain, respectively, call instructions of the working program and the addresses of these instructions. The memorization assembly also comprises an address counter 14 which is connected to address inputs of the command memory 11. This counter is also connected to a command output 15 of an address command pulse selector 23. It receives address command pulses from the memory 11, which are synchronized with the keyboard row scan pulses applied to the latter by the input-output unit 2.

This address command pulse selector 23 comprises a logic circuit 24 of which one input 25 is connected to an output of the input-output unit 2 to receive address command pulses from the command memory 11, these pulses coming from the computer 1. The logic circuit 24 includes another input 26 which is connected to an output of an external clock 27, synchronized at an input 28 with the keyboard row scan pulses. Two inputs 29 and 30 of this logic circuit are connected to a switch 31 which permits selecting the address command pulses coming either from the computer 1 or from the clock 27. The logic circuit 24 includes, for example, an OR gate 32 whose output constitutes the output 15 of the selector and whose inputs are connected to the outputs of two AND gates 33 and 34, respectively. The input 29 of the selector constitutes one of the inputs of the gate 33, whereas the input 30 of the selector constitutes one of the inputs of the gate 34. The other input of the gate 33 constitutes the input 26 of the selector, connected to the clock 27, and the other input of the gate 34 constitutes the input 25 of the selector, connected to the input-output unit 2. The selection of the command pulses coming from the computer 1 or from the clock 27 is effected by the shifting of the switch 31 to the input 29 or to the output 30, the common terminal 35 of the switch being brought to a logic level 1. This selector permits interrupting at any time the transmission of instructions by the keyboard to allow call instructions contained in the memory 11 to reach the computer. This is obtained particularly by placing the switch 31 in the position 29.

The switching means 10 include a switching circuit 16 connected by inputs 17 to means 18 for reading the call instructions contained in the first part 12 of the command memory 11. The call instruction reading means 18 are themselves connected to this memory. The switching means 16 are also connected to an output of the counter 14 to receive, as will be seen in detail further on, a switching command pulse. The switching means are also connected to the columns 4 of the keyboard 5, and they also include a comparator 19 which is connected to outputs of the input-output unit 2, and to outputs of address reading means 20; these reading means are themselves connected to outputs of the second part 13 of the command memory 11. One output of this comparator is connected to a command input of the reading means 18 for reading the call instructions contained in the memory 11.

The device that has just been described operates in the following manner, when the switch 31 is in position 30: during the initialization of the computer, before the scanning of the keyboard begins, the counter 14 is blocked; the switching circuit receives at its command input 21 a signal preventing any transfer of instructions coming from the keyboard 5 toward the input-output unit 2. Throughout this computer initialization phase, the input-output unit applies no scanning pulse on the rows of the keyboard. At the end of this initialization period, the computer 1, through the input-output unit 2, applies scanning pulses to the rows 3 of the keyboard 5. Synchronous pulses of these scan pulses are then applied simultaneously to the counter 14. The signal applied to the command input 21 of the switching circuit 16 continues to block the transfer of instructions from the keyboard to the input-output unit 2. The outputs of the counter 14 permit addressing the second part 13 of the memory 11, which contains, in coded form, the addresses of the call instructions of the working program. During the scanning of the rows of the keyboard, the comparator 19 permits the comparison of the code corresponding to the scanned row with the address code of the memory 9 which is likewise scanned by the counter 14. If these two codes are identical, the comparator then delivers to an output 21 a command pulse to the means 18 for reading the coded call instructions of the working program. These instructions are then transferred by these reading means 18 from the first part of the command memory 11 to the switching means 16 which then transmit them to the input-output unit 2. When all the rows of the keyboard and all the call instruction addresses recorded in the memory 11 have been scanned, the counter 14 is reset to zero by means known in the state of the art, which are not described here in detail. The command input 22 of the switching means 16 then receives a command signal allowing the transfer of instructions from the keyboard 5. A different set of call instructions can be sent to the computer at any time by placing the switch 31 in position 29.

The device that has just been described makes it possible to block any transfer of instructions from the keyboard at any time, and particularly during the initialization and during the scanning of the rows of the keyboard and of addresses in the command memory; it then allows any transfer of instructions from the keyboard after the initialization and the scanning of the keyboard, or outside of any new transfer of call instructions that might occur when the switch 31 is in position 29. The switch 31 especially makes it possible to call up another program.

What is claimed is:

1. Simulation and security device for data entry keyboard (5) of a computer (1), the keyboard including a set of row conductors (3) and a set of column conductors (4) which are electrically activated and arranged to provide a set of crosspoints, there being a set of selection keys (6) located at respective ones of said crosspoints for outputting electric signals of the row and the column conductors at the repsective crosspoints; the device comprising;

an input-output unit (2) connected between the keyboard and the computer, a first memory (7) for storing an initialization program, a second memory (8) for storing a working program, a memorization assembly (9) for storing coded call instructions, and a switch assembly (10); and wherein the input-output unit furnishes scanning pulses to the row conductors of the keyboard, the computer is connected to said first memory and said second memory, initialization of said computer being accomplished by said initialization program, the working program being applied by said second memory to said computer subsequent to initialization of said computer in response to a transmission of a series of coded call instructions to the computer (1) via the keyboard (5); and wherein said memorization assembly (9) is connected to the input-output unit (2), the switching assembly (10) is connected to the memorization assembly (9) and to the column conductors (4) of the keyboard and to the input-output unit (2) to permit the transmission of the call instructions to the computer, thereby to prevent any transmission of coded instructions from the keyboard during initialization of the computer as well as the prevention of a transmission of the call instructions, the device permitting a subsequent transmission of instructions from the keyboard when all of the call instructions have been received by the computer; and wherein the memorization assembly (9) includes a command memory (11) containing the said call instructions as well as the coded addresses of these instructions, and an address counter (14) connected to the command memory (11); and wherein the security device further comprises;

a pulse selector (23), and the address counter is connected further to a command output of the pulse selector (23) for receiving address command pulses from the commmand memory (11) synchronized with the pulses which scan the row conductors (3) of the keyboard (5); and wherein the switching assembly (10) comprises means (18) for reading call instructions, a switching circuit (16) connected by inputs to the means (18) for reading call instructions, the switching circuit (16) being connected to the command memory (11), to an output of the counter (14) and to the column conductors (4) of the keyboard; and wherein outputs of the switching circuit (16) are connected to inputs of the input-output unit (2), the switching assembly (10) furthermore including a comparator 19 connected to outputs of the input-output unit (2) to receive at each moment a keyboard row scanning code, the switching assembly (10) including means (20) connected to the comparator (19) for reading coded addresses of the call instructions, an output (21) of the comparator being connected to the means (18) for reading call instructions to command the transfer of the call instructions to the switching means (16) and to the input-output unit (2) when the code of the scanned row conductor corresponds to the code of the call instruction address, the switching means (16) being connected to the counter (14) for blocking any transfer of instructions coming from the keyboard (5) during the initialization and during the scanning of the addresses of the command memory (11) and of the row conductors (3) of the keyboard (5).

2. Device according to claim 1, characterized in that the pulse selector (23) includes a logic circuit (24) of which one input is connected to one output of the input-output unit (2) to receive address command pulses of the command memory (11), coming from the computer (1), and of which another input is connected to an output of an external clock (27) providing address command pulses of the command memory (11), one output (15) of this selector being connected to an input of the counter (14), two command inputs of this selector being connected to a switch (31) for selecting the pulses coming from the input-output unit (2) or from the external clock (27), the address command pulses being synchronized with the pulses scanning the rows of the keyboard (5).

* * * * *